UNITED STATES PATENT OFFICE.

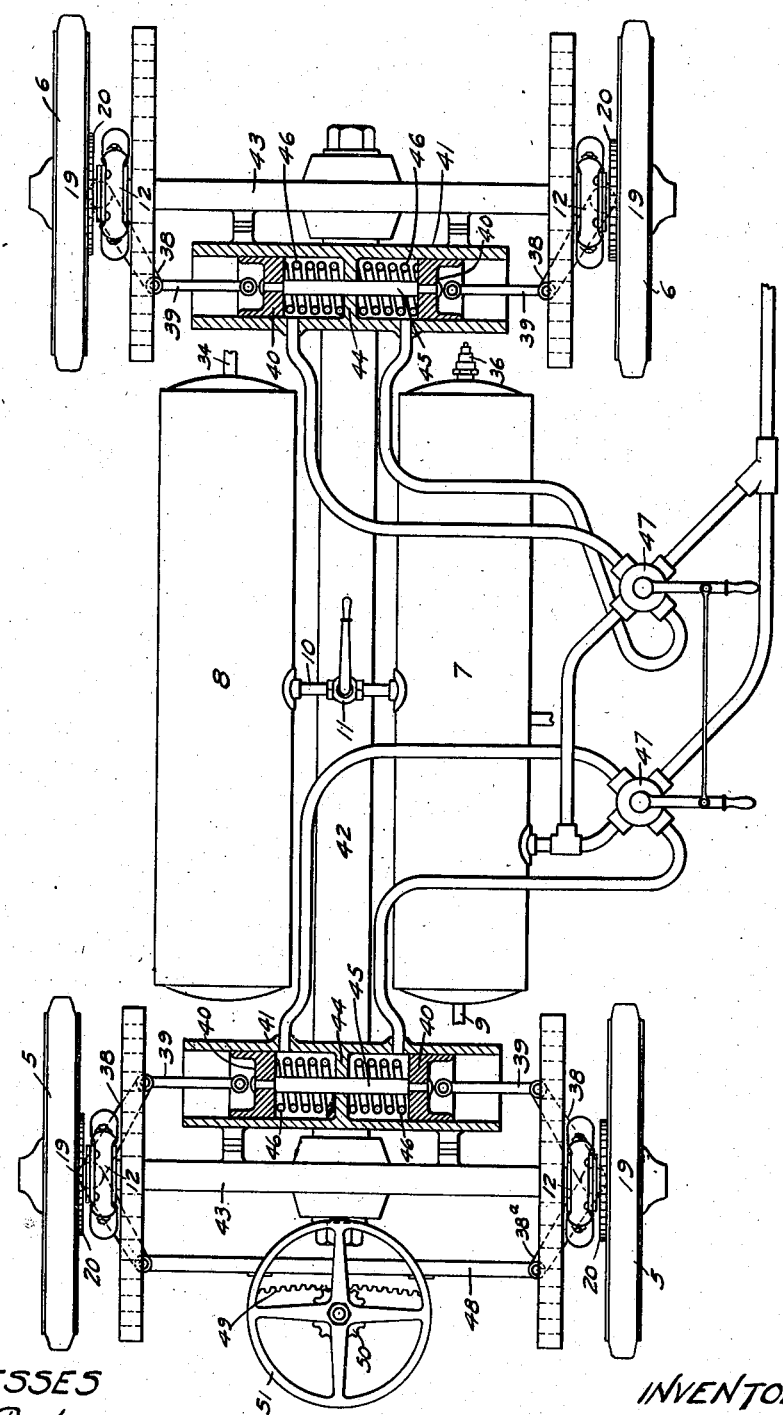

WALTER W. MACFARREN, OF PITTSBURG, PENNSYLVANIA, ASSIGNOR TO WM. H. DONNER, OF PITTSBURG, PENNSYLVANIA.

STEERING-GEAR FOR AUTOMOBILES.

No. 867,282.     Specification of Letters Patent.     Patented Oct. 1, 1907.

Application filed March 9, 1907. Serial No. 361,623.

*To all whom it may concern:*

Be it known that I, WALTER W. MACFARREN, a citizen of the United States of America, residing at Pittsburg, in the county of Allegheny and State of Pennsylvania, have invented certain Improvements in Self-Propelled Vehicles, of which the following is a full, clear, and exact description.

My invention relates to self-propelled vehicles, and particularly to self-propelled wagons and trucks for heavy hauling, as merchandise or large passenger busses.

My invention relates more particularly to self-propelled vehicles using compressed air as a motive power, for which I filed an application for Letter Patent of the United States on June 18th, 1906, bearing the Serial No. 322207.

In the said application the air is compressed by an air compressor driven by a gas engine, the same being located under the seat of the vehicle, or in any other convenient position. From the compressor the compressed air is led to a reservoir and from thence through a controlling valve to a number of compressed air motors, there being preferably four of these latter, one arranged to drive each wheel of the vehicle.

In the above application I have illustrated and claimed the various elements of the combination with reference to the generation of the power and its application to drive the wheels of the vehicle. I have also illustrated and described therein the method and means employed for steering the vehicle by compressed air, but have not claimed these means.

The purpose of the present application is to illustrate and claim the means for steering the vehicle by compressed air. In this connection it is obvious that for the purpose of the present application it is immaterial whether the air be compressed on the vehicle by a prime motor and compressor carried thereby, or whether the same be compressed in a stationary power plant and pumped into a reservoir on the vehicle. Further, it does not matter whether the wheels of the vehicle are driven by compressed air or by the prime motor direct or by other means, such as stored power other than compressed air.

The elements necessary to the present combination are the wheels, the pivoted axles, the air cylinders for steering the wheels, the valves controlling the admission and release of the air pressure to and from said cylinder and the reservoir for storing the air under pressure.

Referring to the drawing, the stub axles carrying the wheels have mounted thereon the levers 38; connected to these levers by links 39 are pistons 40, working in double cylinder 41. These cylinders are supported by the reach bar 42, the same being pivotally connected to the axles 43. The cylinders 41 are also clamped or fastened to axles 43, so that they are at all times parallel with the axles.

The cylinders 41 are divided by a division wall 44, and the pistons 40 in each cylinder are connected by a rod 45 so that both move together. Between the piston 40 and the division wall 44 there are inserted strong coil springs 46. These springs are in close contact with the ends of the pistons 40, and with the division wall 44, so that no steering movement of the wheels can take place without compressing one or the other of the springs.

Mounted on the dash board, or other location convenient to the drive, I provide two four way valves 47 of ordinary construction. These valves are connected to the reservoir by suitable piping, and also each of them is connected to a steering cylinder 41 in such manner that air pressure may be applied to either end of the cylinder at will. By this arrangement it is obvious that the air pressure will overcome the resistance of the spring 46, and cause the wheels to assume various positions, the same being controlled by the four way valves.

In order to steer either set of wheels independently, I provide two valves, and two cylinders, but the valves would usually be connected in such a manner that both could be operated by one movement, thus steering all four wheels at once.

In order to provide against possible breaks in the air connections, cylinders, springs, etc., of the air steering devices, I also provide on the front end of the vehicle levers 38ª, extending forward from the stub axles carrying the wheels, these levers being connected by a link 48 having mounted thereon a curved rack or gear segment 49. Engaging with this rack there is a pinion 50, and connected to this pinion by a vertical shaft, a hand steering wheel 51.

The extreme convenience and ease of operation of this device will be readily apparent, and the heaviest vehicle can be steered by the use of my invention with almost no manual exertion, and the wheels will move instantly at the will of the operator.

A further advantage of the above construction consists in the fact that the wheels are held to their course by yielding connections with the running gear, so that they can yield sidewise to a slight extent and thus reduce the effect of shocks.

I claim:—

1. In a motor vehicle, the combination of four wheels, a fluid pressure supply, and means for steering either the front or rear wheels independently or simultaneously by the application of said fluid pressure.

2. In a motor vehicle, wheels, a reservoir of compressed air, a cylinder, a piston, connections between said piston and said wheels adapted to steer the same, and a spring arranged to return the wheels to their original position.

3. In a motor vehicle, the combination of four wheels, a fluid pressure supply, a pressure cylinder connected to a pair of wheels and adapted to steer the same, a controlling valve adapted to control the admission of the pressure to said cylinder, a second pressure cylinder connected to a second pair of wheels and adapted to steer the same, a second controlling valve adapted to control the admission of the pressure to the second cylinder, and means for operating said valves independently or simultaneously to steer the wheels.

4. In a motor vehicle, the combination of wheels, a reservoir of compressed air, a double acting cylinder, pistons in said cylinder, connections between said pistons and said wheels, springs between said pistons and the cylinder head adapted to hold said pistons in a central position when the air pressure is not applied to said cylinder, and to return said pistons to a central position after the air pressure has been released.

WALTER W. MACFARREN.

Witnesses:
 O. J. TOPE,
 J. B. CESSUA.